United States Patent
Zhou et al.

(10) Patent No.: US 12,173,381 B2
(45) Date of Patent: Dec. 24, 2024

(54) METHOD FOR PRODUCING MAGNESIUM-LITHIUM ALLOY BY GASEOUS CO-CONDENSATION METHOD

(71) Applicant: SICHUAN UNION SHINE NEW ENERGY SCI-TECH CO., LTD, Sichuan (CN)

(72) Inventors: Jun Zhou, Sichuan (CN); Guangli Zhang, Sichuan (CN); Pei Yang, Sichuan (CN); Yong Gan, Sichuan (CN)

(73) Assignee: SICHUAN UNION SHINE NEW ENERGY SCI-TECH CO., LTD, Sichuan (CN)

( * ) Notice: Subject to any disclaimer, the term of this patent is extended or adjusted under 35 U.S.C. 154(b) by 502 days.

(21) Appl. No.: 17/596,417

(22) PCT Filed: Sep. 17, 2020

(86) PCT No.: PCT/CN2020/115864
§ 371 (c)(1),
(2) Date: Dec. 9, 2021

(87) PCT Pub. No.: WO2021/135399
PCT Pub. Date: Jul. 8, 2021

(65) Prior Publication Data
US 2022/0307108 A1 Sep. 29, 2022

(30) Foreign Application Priority Data
Jan. 3, 2020 (CN) .......................... 202010007931.X (51) Int. Cl.
*C22B 26/12* (2006.01)
*B01D 5/00* (2006.01)
*B22F 9/20* (2006.01)
*C22B 5/04* (2006.01)
*C22B 9/04* (2006.01)
*C22B 26/22* (2006.01)

(52) U.S. Cl.
CPC ............ *C22B 26/12* (2013.01); *B01D 5/0036* (2013.01); *B22F 9/20* (2013.01); *C22B 5/04* (2013.01); *C22B 9/04* (2013.01); *C22B 26/22* (2013.01)

(58) Field of Classification Search
CPC .. C22B 26/12; C22B 5/04; C22B 9/04; C22B 26/22; B22F 9/20; B01D 5/0036
See application file for complete search history.

(56) References Cited

FOREIGN PATENT DOCUMENTS

| CN | 1827808 A | 9/2006 |
|----|-----------|--------|
| CN | 101560603 A | 10/2009 |
| CN | 102080164 A | 6/2011 |
| CN | 109536751 A | 3/2019 |
| CN | 110042240 A | 7/2019 |
| CN | 110205491 A | 9/2019 |
| CN | 111097920 A | 5/2020 |
| JP | 2005097648 A | 4/2005 |

*Primary Examiner* — Jessee R Roe
(74) *Attorney, Agent, or Firm* — NKL Law; Allen Xue (57) ABSTRACT

The present invention belongs to the technical field of preparation of light metal alloy materials, in particular to a method for producing a magnesium-lithium alloy by a gaseous co-condensation method. The method comprises the steps of: 1) mixing and briquetting a lithium salt, a refractory agent and a catalyst under pressure, and then thermally decomposing to form an unsaturated composite oxide; 2) respectively crushing and ball-milling, and then briquetting the unsaturated composite oxide, magnesium oxide, a reducing agent and a fluxing agent; 3) reducing briquettes in vacuum; 4) making a gas pass through a first condensing chamber of a temperature control device, and then purifying; 5) The purified metal gas is condensed into the condensing phase of the alloy through the second condensing chamber of a quenching device; 6) obtaining the magnesium-lithium alloy with a purity being 99.5% or above by virtue of smelting and flux-refining, and then purifying by distillation. The magnesium-lithium alloy obtained in the present application is not segregated, so that a stable β-phase solid solution or a compound having an increasing purity being 99.95% is formed.

9 Claims, 2 Drawing Sheets

METHOD FOR PRODUCING MAGNESIUM-LITHIUM ALLOY BY GASEOUS CO-CONDENSATION METHOD

TECHNICAL FIELD

The present invention belongs to the technical field of preparation of light metal alloy materials, relates to a new method for producing a uniform high-purity magnesium-lithium alloy with ultra-fine grains, and particularly a method for producing a magnesium-lithium alloy by the gaseous co-condensation method.

BACKGROUND

A lithium metal atom has an atomic number of 3, an atomic nucleus consists of three protons and four neutrons, three electrons are around the nucleus and there are two electrons on a K electron shell which is structurally $1S^2 2S^1$. Lithium is very reactive chemically, and compounds thereof are polar molecules that absorb water easily, so that it is difficult to extract the metal. Such metal and a plurality of elements form very important compounds, solid solutions and other alloys, and the formed alloy is good in deformability and easy to process.

A metal lithium has a melting point as low as 180.54° C. and a boiling point of 1,327±10° C. However, magnesium, aluminium, calcium, silver and bismuth have high melting points, and at the smelting temperature, these gases have a certain vapor pressure, and these metal gases coexist in a mutually soluble state. This may be for condensation and agglomeration into the alloys with different contents, so that the obtained alloy phases are uniform and physical and chemical properties are stable and consistent.

China has abundant lithium resources. At present, the alloys formed by the metal lithium and other metal elements, for example, magnesium-lithium alloy which is also divided into a magnesium-rich alloy and a lithium-rich alloy. Now, the magnesium-rich alloy has been generally applied, for instance β-phase LA141 and LA91. "Direct mixing" is generally applied to the magnesium-lithium alloy, namely, melting and directly reacting or electrolytically depositing the lithium obtained by an electrolytic process and other metals. Due to the fact that the melting point of each of alloy elements is far higher than the melting point of the lithium, the direct reaction and electrolysis temperatures are generally high. At 800° C., the vapor pressure of a pure metal lithium reaches 390.6 Pa, but the lithium is highly reactive, and reacts with oxygen, nitrogen and hydrogen in the air in alloying, which will lose a lot of lithium. A lithium density is only 0.53 g/cm³, but the densities of other alloy elements are far higher than that of the lithium, which will cause segregation in alloying, and thus affect the processing property and application field thereof.

For the time being, a lithium chloride-potassium chloride molten-salt synthesis by high temperature electrolysis is still the method for producing the lithium in industry. This method has the disadvantages of high raw material price, strict requirement, enormous fixed investment for building the factory and easiness to corrode equipment; furthermore, due to chlorine generation, the environmental protection investment is high, the production environment is severe, the yield is not high, K and Na included in the lithium are high and are removed difficultly, so that the manufacture cost of the metal lithium remains stubbornly high, and the alloy manufacture cost is increased.

Lithium and lithium alloys have a variety of excellent properties, and thus are irreplaceable in various fields. In an atomic energy industry, thermonuclear reaction, intercontinental missile and artificial satellite, lithium and some lithium compounds are high-energy fuels for space rockets, artificial satellites, supersonic aircrafts, guided missiles and submarines, etc. Alloys made by lithium, magnesium and aluminium are lightest structural materials, lithium and lithium compounds are ideal battery materials that have been applied extensively; and the lithium alloy has good deformability and processability, thereby having an extensive application prospect.

SUMMARY

With regard to the technical problems above, the present invention provides a method for producing a magnesium-lithium alloy by a gaseous co-condensation method. The magnesium-lithium alloy, prepared by the method, having a purity being 99.0 wt %-99.95%, may be applied to more fields. Besides, through the method, industrialization can be realized and the magnesium-lithium alloy can be lowered; compared with the prior art, more energy conservation and environment protection are realized.

To achieve the above objectives, the specific technical solution of the present invention is as follows:

A method for producing a magnesium-lithium alloy by a gaseous co-condensation method, comprising the following steps:

1) a lithium salt, a refractory agent and a catalyst are mixed in proportion, and then briquetted under the pressure of 35-45 Mpa; the prepared substance is charged into an industrial tube furnace for thermal decomposition, the sublimated and condensed catalyst is recycled, and an unsaturated composite oxide is generated by lithium oxide and a refractory agent.

Preferably, the industrial tube furnace has a vapor-deposited nitrocarbon compound crucible.

The granularity of each of the lithium salt, the refractory agent and the catalyst is less than 100 μm before briquetting.

Preferably, the industrial tube furnace has a size of φ150-φ330 mm*3,300 mm.

The lithium salt is lithium-containing carbonate, nitrate, sulfate, silicate or lithium-containing sulfide; the refractory agent is CaO, $Al_2O_3$, MgO, etc.; the catalyst is $Sb_2O_3$, $Bi_2O_3$, etc.

Preferably, a molar ratio of the lithium salt to the refractory agent to the catalyst is 1: (1.4-1.8):(0.2-0.8).

In briquetting, the sphere to be pressed is 25-35 g/Nr., and is of the almond shape with both sides thinner than the middle part, which is beneficial for carbon dioxide discharge during the thermal composition; further, the sphere remains a certain shape as it is decomposed at a high temperature, in order to prevent solid particles from falling off; in the industrial tube furnace, the vacuum degree is controlled to be 10-20 pa, the temperature to be 860-950° C., and the thermal composition rate thereof may reach 99% or above.

2) The unsaturated composite oxide obtained in step 1), magnesium oxide, the reducing agent and the fluxing agent are respectively crushed and ball-milled till a granularity is 40-100 μm, and briquetted into almond-like briquettes at a weight of 25-35 g/Nr. under the pressure of 30-45 Mpa.

The reducing agent is high silicon iron, aluminium powder having an Al content being more than or equal to 99 wt %, aluminium powder having an activity being more than 70 wt % and a granularity being less than 8 μm, the aluminum silicon powder having an Al—Si content being more than or equal to 98% or carbon powder, or silicon iron having a preferred grade being more than 75%; the fluxing agent is $CaF_2$ having a grade being more than 97.5%.

Preferably, the mass ratio of the unsaturated composite oxide to the magnesium oxide is 3-80:20-97; the mass ratio of the total mass of the unsaturated composite oxide and the magnesium oxide to the reducing agent to the fluxing agent is 76-87:15-23:1-3.

3) The briquettes in step 2) are charged into an industrial heat-resistant tube furnace, wherein the vacuum degree thereof is controlled to be 1-20 pa and the temperature to be 900-1,300° C., at this time, the reduction product is in the gaseous state and carries solid materials; a thermal reduction rate is more than or equal to 99%.

Preferably, the industrial heat-resistant tube furnace has a size of φ159-φ330 mm*3,300 mm.

4) The gas carrying the solid materials passes through a centrifugal separator in the dust collector, and then enters the first condensing chamber in the temperature control device, a double-casing cooler is applied as the condenser in the first condensing chamber, the temperatures of the centrifugal separator and the first condenser are controlled to be 850-900° C. with the constant-temperature gas at the airflow velocity of 1.2-1.8 m/sec in the sandwich. After the dust collector is dedusted, more than 98 wt % of solid particles having the granularity being more than 20 μm are removed. Then, the gas passes through the 0.5 μm micron ceramic filter to purify more than 99.95% of carried dust, and the outlet temperature of the micron ceramic filter is controlled to be 700-750° C.

5) The pure metal gas passes through the second condensing chamber of the quenching device, a double-casing cooler is applied as a condenser in the second condensing chamber, a low temperature cooling liquid below −100° C. is thermally exchanged with the metal gas, heat is transferred to an inner wall from a center of the cooler by a gas at 1.5-4 m/sec gas, and the ratio of the cooling area to the metal of the condensate phase is 0.4-0.7 $dm^3$/kg. so that the metal gas may be rapidly condensed as the condensed phase of the alloy.

Figure 1:
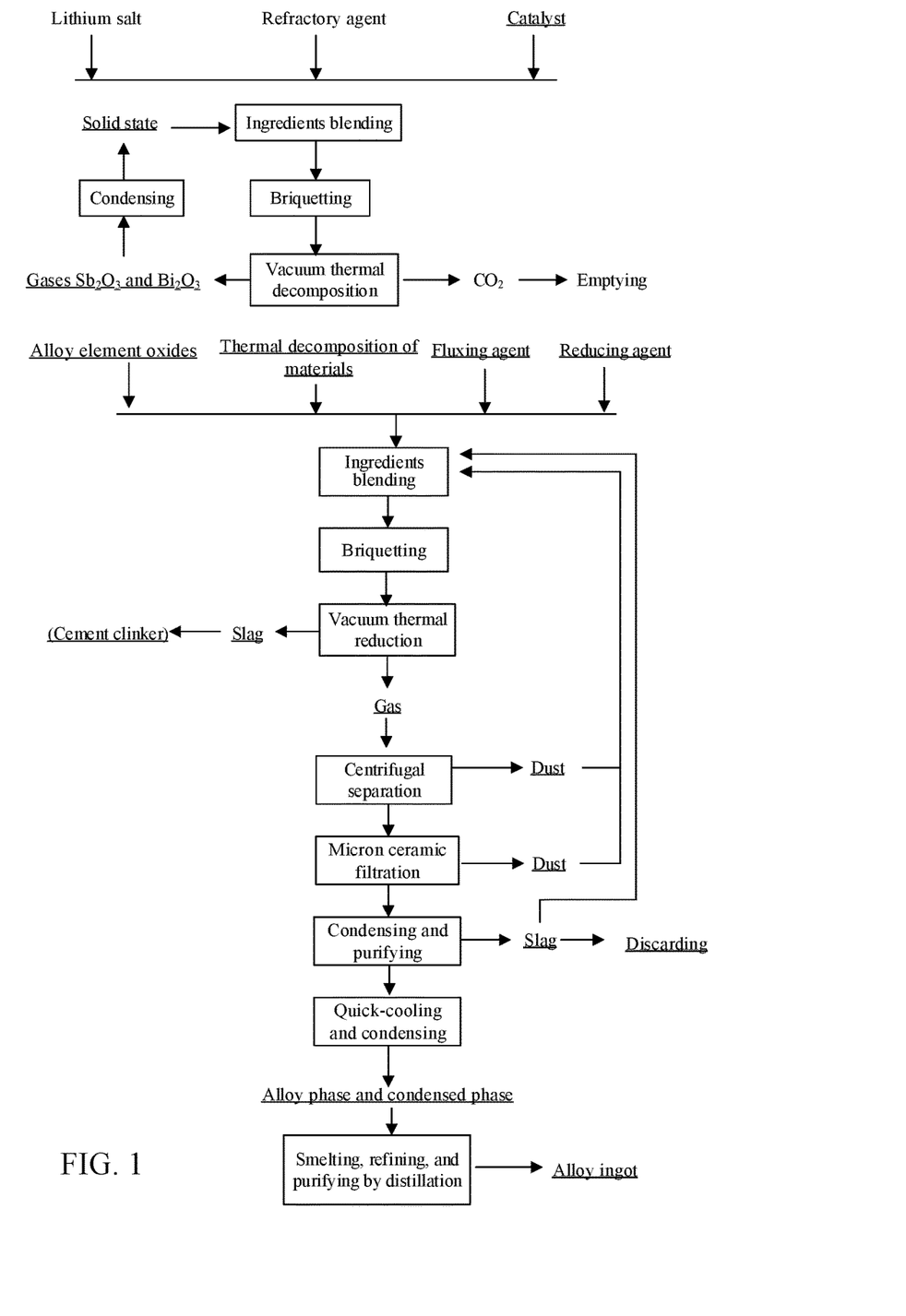
FIG. 1 is a process flow diagram of a method for producing a magnesium-lithium alloy by a gaseous co-condensation method provided by the present invention.
Figure 2:
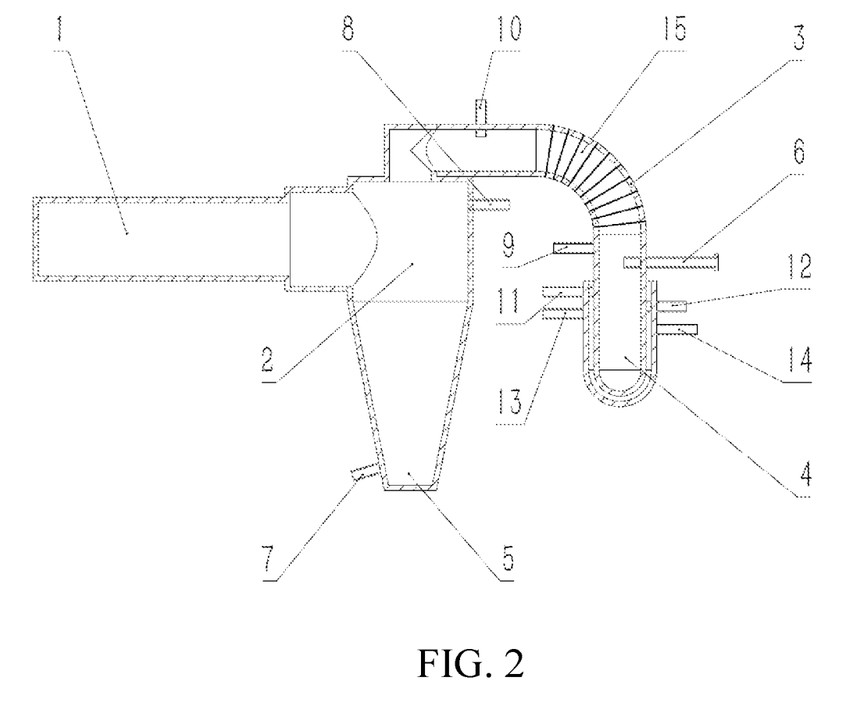
FIG. 2 is a structural diagram of the quenching device provided by the present invention.

The quenching temperature control device comprises a reaction zone, a dust chamber, the first condensing chamber, the second condensing chamber, and a slag discharge hole of the dust chamber and a vacuum tube, the reaction area thereof is in communication with the dust chamber; a centrifugal separator is arranged in the dust chamber, a lower end of which is provided with a funnel; a lower end of one side of the funnel is provided with the first heating zone inlet, and the slag discharge hole of the dust chamber is defined at the bottom of the funnel; an upper end of one side of the dust chamber is provided with the first heating zone outlet, the top of the dust chamber is provided with the first condensing chamber, the second heating zone outlet is defined at the upper end of the connection between the first condensing chamber and the dust chamber and the ceramic micron filter is arranged in the first condensing chamber; the first condensing chamber is in communication with the second condensing chamber; the second heating zone inlet is defined in a connection with the second condensing chamber in the first condensing chamber; the vacuum tube is arranged on a connection with the first condensing chamber in the second condensing chamber, and the cooling liquid inlet and the cooling air inlet as well as the cooling liquid outlet and the cooling air outlet are respectively defined at both sides of the second condensing chamber.

6) A magnesium-lithium alloy raw ingot having a purity being 99.5% is obtained by flux smelting and refining of the magnesium-lithium alloy in the condensed phase in the pit furnace under the protection of Ar and mixing.

7) The magnesium-lithium alloy raw ingot is separated by distillation to obtain the magnesium-lithium alloy having the purity being 99.95% or above.

Preferably, when the magnesium-lithium alloy raw ingot is in a distillation device, the lower temperature of a distiller is controlled to be 850-950° C., the middle temperature to be 700-800° C., and the upper temperature to be lower than 100° C.; impurities with a high melting point are removed from the lower part, including Fe, Ni, Co, Si and Ca; metal impurities with a low melting point are removed from the upper part, including k, Na, and a middle liquid is 99.95% magnesium-lithium alloy.

Finally, the magnesium-lithium alloy is subject to ingot casting to obtain a magnesium-lithium alloy finished product.

In the present application, the preferred raw material lithium salt is lithium carbonate; the lithium carbonate is subject to thermal decomposition reaction, with the reaction formula below:

$Li_2CO_3 \rightarrow (Heating) Li_2O + CO_2$.

In the present application, antimony and bismuth oxides do not participate in chemical reactions. The added antimonous oxide and bismuth oxide merely absorb liquid state lithium carbonate when a decomposition temperature is lower than 850° C. at an initial reaction stage, so that the liquid globules of the lithium carbonate cannot get smaller, which is beneficial for thermal decomposition of lithium carbonate, that is, the thermal decomposition surface area of the lithium carbonate increases; upon the decomposition, the temperature within the thermal decomposition furnace rises to 860-900° C. Also, the antimonous oxide and the bismuth oxide will vaporize and sublimate to leave away from products, thereby lowering the calcium oxide addition and forming stable $Li_2O(2-x)CaO$ as the unsaturated oxide, wherein x is less than 0.5, and a unit production capacity may be increased. A reaction temperature is lowered, main effects are increased due to the reaction interface area, the reaction speed is improved, the product quality is not affected, and the decomposition rate may be improved by 12-15% under the same conditions. The vapor deposition temperature is greater than 1,000° C., a deposition thickness is less than 0.2-0.3 μm, the surface is smooth without defects, and the framework is made from metals with a high melting point, including nickel base alloy and titanium alloy. A pure nickel base alloy and the titanium alloy will be firmly bonded and deposited as carbon and nitrogen compounds or $Al_2O_3$. Now, domestic and foreign crucibles are made from high purity graphite. However, the life of the crucibles is only 5-6 times because the high-purity graphite is easily subject to Bootle reaction; the fallen carbons will pollute the products, and the crucibles formed by deposition will not react with the materials, while the crucible may be repaired using a spraying technology, with the service life being longer than the high-purity graphite by more than 20 times.

95-97% dust can be removed only by centrifugation, and more than 99.99% dust can be removed by the micron ceramic filtration, both of which must be used cooperatively. If centrifugation is used only, the dust cannot be cleaned; if the micron ceramic is used only, the filter has a short lifetime, and the filter recycling is required frequently; if the two are used cooperatively, more than 99.99% of dust can be removed, and a reprocessing cycle can be improved by more than 15 times.

In the quenching device, when the low temperature liquid and the cooling air are combined, the cooling temperature drops to below 150° C. from 700-750° C. within 0.5-1.5 min, in order to obtain a condensate; the low temperature liquid has a strong heat absorption, the cooling air having a flow velocity of 1.5-4 M/sec can take away the absorbed heat rapidly, thereby achieving the quenching effect.

Compared with the preparation of the alloy by the direct mixing and an electrolytic process, if the technology is used for building the 1,000 t/y metal magnesium-lithium plant, the fixed investment is no more than RMB 60 million, only accounting for one third of the fixed asset investment for the lithium plant of the same size; compared with an electrolytic process, the manufacturing cost may be lowered by 20-30%, the raw material sources are abundant, and the magnesium-lithium yield is improved. The magnesium-lithium alloy is not segregated, so that a stable β-phase solid solution or compound having an increasing purity being 99.95% is formed. Compared with the existing other domestic and foreign studies, this study overcomes the difficulties encountered in the metal lithium industrialization and realizes the industrialization; and moreover, the technology is applied to producing the magnesium-lithium alloy having the purity being 99.95% improved from 99%.

The present invention has the following positive effects below:
  (I) For the alloy produced by the co-condensation method, metal extraction and alloying are unified in one process, which makes the best of heat energy to dedust and purify; the gaseous phase is rapidly cooled as the condensed phase, so that the alloy elements of the alloy are distributed uniformly and are not segregated.
  (II). Dust is removed by mixed vapor of the lithium obtained by virtue of vacuum-thermal reduction and the alloy elements through centrifugal sedimentation; metal vapor with an ideal purity may be completely obtained by deep filtration of micron ceramic; and the alloy is distilled and refined in the prior art, thereby being suitable for industrialization. Meanwhile, the magnesium production technology by the Pidgeon Process and equipment are very mature in China, a variety of shaping equipment for magnesium smelting may be used to reduce the fixed asset investment and realize the industrialization easily.
  (III). The processability and mechanical property of the alloy are improved, and the improvement of the reaction tank makes industrialization, mechanization and automation become possible; and meanwhile, the raw material sources are extensive, the fixed investment is small, the production cost is low, the flow is shortened, and energy conservation and environment protection and good economic benefit are realized.
  (IV). There are three reasons for applying the silicon iron as the reducing agent in the present invention, firstly, it has a low price and an abundant sources in market; secondly, the gaseous lithium generated from reaction is rather gentle, so that almost 100% metal can be collected; and thirdly, the service life of a vacuum pump can be prolonged.

DESCRIPTION OF THE DRAWINGS

In which, 1—reaction zone, 2—dust chamber, 3—first condensing chamber, 4—second condensing chamber, 5—slag discharge hole of dust chamber, 6—vacuum tube, 7—first heating zone inlet, 8—first heating zone outlet, 9—second heating zone inlet, 10—second heating zone outlet, 11—cooling liquid outlet, 12—cooling liquid inlet, 13—cooling air inlet, 14—cooling air outlet, and 15—ceramic micron filter.

DESCRIPTION OF EMBODIMENTS

The present invention will be further described in detail in combination with specific implementations for the purpose of clear understanding of the objectives, technical solutions and advantages of the present invention, but it shall not be understood that the scope of the above subject of the present invention is only limited to the following embodiments.

The structure of the quenching device used in the following embodiments are as follows: the quenching temperature control device comprises a reaction zone, a dust chamber, a first condensing chamber, a second condensing chamber, and a slag discharge hole of the dust chamber and a vacuum tube, and the reaction zone thereof is in communication with the duct chamber; a centrifugal separator is arranged in the dust chamber, a lower end of which is provided with a funnel; a lower end of one side of the funnel is provided with a first heating zone inlet, and the slag discharge hole of the dust chamber is defined at the bottom of the funnel; the upper end of one side of the dust chamber is provided with the first heating zone outlet, the top of the dust chamber is provided with the first condensing chamber, the second heating zone outlet is defined at the upper end of the connection between the first condensing chamber and the dust chamber and a ceramic micron filter is arranged in the first condensing chamber; the first condensing chamber is in communication with the second condensing chamber; the second heating zone inlet is defined in the connection with the second condensing chamber in the first condensing chamber; the vacuum tube is arranged on the connection with the first condensing chamber in the second condensing chamber, and the cooling liquid inlet and the cooling air inlet as well as the cooling liquid outlet and the cooling air outlet are respectively defined at both sides of the second condensing chamber.

The first and second condensing chambers are double-casing coolers.

A technology of separation by distillation is prior art.

Embodiment 1

A method for producing a magnesium-lithium alloy by the gaseous co-condensation method, comprising the following steps:
  1) Raw materials are weighed in proportion, wherein the granularity of lithium carbonate is 89 μm, and the granularity of calcium oxide is 74 μm; the lithium carbonate, CaO and a catalyst $Sb_2O_3$ are mixed in a molar ratio of 1:1.6:0.4, and briquetted under the pressure of 35 Mpa; each briquette is 28 g, and is of an almond shape. The prepared briquettes are charged into a φ330 mm*3,300 mm industrial tube furnace with a vapor-deposited nitrocarbon compound crucible for thermal decomposition, the sublimated and condensed catalyst is recycled, and an unsaturated composite oxide is generated by lithium oxide and a refractory agent. The vacuum degree of the industrial tube furnace is 10 pa, and the temperature is 860° C. High temperature decomposition time is 5 h, the decomposition rate of the lithium carbonate decomposed into lithium oxide is 99.2%, and a metal lithium yield reaches 99.5%.

2) The mass ratio of the unsaturated composite oxide formed by the lithium oxide obtained in step 1) and the refractory agent to the magnesium oxide is 88.2:11.8 (in the composite oxide, MgO:CaO=1:1); the unsaturated composite oxide, the magnesium oxide, silicon iron and $CaF_2$ are respectively crushed and ball-milled till a granularity is 60 and then mixed according to a mass ratio of the total mass of the unsaturated composite oxide and the magnesium oxide to the silicon iron to the $CaF_2$ of 80:18:2, and finally pressed into briquettes at the weight of 28 g/Nr. under the pressure of 30 Mpa.

3) The briquettes in step 2) are put into a φ330 mm*3,300 mm industrial heat-resistant tube furnace having the vacuum degree being 1 pa and the temperature being 1,185° C.; and at this time, the reduction product is in the gaseous state and carries solid materials, the magnesium reduction recovery is more than 95% and a lithium reduction is 99%.

4) The gas carrying the solid materials passes through a centrifugal filter in the dust chamber and the first condensing chamber, wherein the first condensing chamber has a sandwich; and the temperatures of a centrifugal separator and the first condensing chamber are controlled to be 880° C. with the gas at an airflow velocity of 1.5 m/sec; and the gas carrying 98% of more than 20 μm solid particles is removed while passing through the first condensing chamber, more than 99.95% of carried dust is purified when the gas passes through 0.5 μm micron ceramic filter, and an outlet temperature is controlled to be 730° C.

5) The pure metal gas passes through the second condensing chamber of the quenching device; when the temperature of an inner layer of a double-casing cooler of the second condensing chamber is controlled to be 60° C., the low temperature cooling liquid below −110° C. is thermally exchanged with the metal gas on an outer layer; heat is transferred to an inner wall from a center of the cooler by the gas at 3 m/sec, and the cooling area is 0.65 dm³/kg, so that the metal gas may be condensed as the condensed phase of the alloy.

6) A magnesium-lithium alloy raw ingot having a purity being 99.5% is obtained by flux smelting and refining of the magnesium-lithium alloy in the condensed phase in the pit furnace under the protection of Ar and mixing.

7) The magnesium-lithium alloy raw ingot is separated by distillation; the lower temperature of the distiller is controlled to be 900° C., the middle temperature to be 750° C., and the upper temperature to be 70° C.; impurities with the high melting point are removed from the lower part, including Fe, Ni, Co, Si and Ca; metal impurities with the low melting point are removed from the upper part, including k, Na, and a magnesium-lithium alloy is discharged from a middle part.

Finally, the magnesium-lithium alloy is subject to ingot casting, and then stored after surface treatment.

The obtained magnesium-lithium alloy is detected according to the national standards, and the mass percentages of all elements are as follows:

| Mg | Li | Fe | Ni | Cu | Al | Mn |
|---|---|---|---|---|---|---|
| 90.752 | 9.2 | 0.0015 | 0.00045 | 0.00035 | 0.004 | 0.0005 |
| Ti | Ca | Si | Zn | K | Na | Others |
| 0.0003 | 0.015 | 0..0055 | 0.0008 | 0.0046 | 0.009 | 0.006 |

As can be seen from the above, the purity of the magnesium-lithium alloy obtained by the method reaches 99.95 wt %, the stable and uniform α- and β-phase solid solutions and compounds of the magnesium-lithium alloy are formed, and a good processability can be realized, so that the alloy can meet the applications in various industrial fields. Compared with the direct mixing, the manufacture cost is as low as 20-30%, the raw material sources are abundant, the segregation phenomenon is overcome, the purity is improved, the alloy property is improved, and industrialization is realized.

Embodiment 2

A method for producing a magnesium-lithium alloy by the gaseous co-condensation method, comprising the following steps:

1) Raw materials are weighed in proportion, wherein the granularity of lithium carbonate is 89 and the granularity of calcium oxide is 74 μm; the lithium carbonate, CaO+MgO, $Al_2O_3$ and a catalyst $Sb_2O_3$ are mixed in a molar ratio of 1:1.45:0.2:0.4, and then briquetted under the pressure of 40 Mpa; each briquette is 28 g, and is of an almond shape. The prepared briquettes are charged into a vapor-deposited nitrocarbon compound crucible of a φ330 mm*3,300 mm industrial tube furnace for thermal decomposition, the sublimated and condensed catalyst is recycled, and the unsaturated composite oxide is generated by lithium oxide and a refractory agent. the vacuum degree of the industrial tube furnace is 10 pa, and the temperature is 860° C. High temperature decomposition time is 5 h, the decomposition rate of the lithium carbonate decomposed into lithium oxide is 99.3%, and a metal lithium yield reaches 99.5%.

2) The mass ratio of the unsaturated composite oxide formed by the lithium oxide obtained in step 1) and the refractory agent to the magnesium oxide is 87.7:12.3; the unsaturated composite oxide, the magnesium oxide, silicon iron and $CaF_2$ are respectively crushed and ball-milled till a granularity is 60 μm, and then mixed according to a mass ratio of the total mass of the unsaturated composite oxide and the magnesium oxide to the silicon iron to the $CaF_2$ of 79:19:2, and finally pressed into briquettes at the weight of 28 g/Nr. under the pressure of 30 Mpa.

3) The briquettes in step 2) are put into a φ330 mm*3,300 mm industrial heat-resistant tube furnace, wherein the vacuum degree is controlled to be 3 pa and the temperature to be 1,200° C.; and at this time, the reduction product is in the gaseous state and carries solid materials, the magnesium reduction recovery is more than 95.1%, and a lithium reduction is 99.1%.

4) The gas carrying the solid materials passes through a centrifugal filter in the dust chamber and a first condensing chamber, wherein the first condensing chamber has a sandwich; and the temperatures of a centrifugal separator and the first condensing chamber are controlled to be 900° C. with the constant-temperature gas at an airflow velocity of 1.6 m/sec; the gas carrying 98% of more than 20 μm solid particles is removed while passing through the first condensing chamber, more than 99.95% of carried dust is purified when the gas passes through 0.5 μm micron ceramic filter, and an outlet temperature is controlled to be 740° C.

5) The pure metal gas passes through a quenching second condensing chamber; for the condenser that is the double-casing cooler, when the temperature of the inner layer is controlled to be 65° C., the low temperature cooling liquid below −105° C. is thermally exchanged with the metal gas on an outer layer; heat is transferred to the inner wall from the center of the cooler by a gas at 4 m/sec, and the cooling area is 0.7 dm$^3$/kg, so that the metal gas may be rapidly condensed as the condensed phase of the alloy.

6) A magnesium-lithium alloy raw ingot having a purity being 99.5% is obtained by flux smelting and refining of the magnesium-lithium alloy in the condensed phase in the pit furnace under the protection of Ar.

7) A magnesium-lithium alloy raw ingot is separated by distillation. The lower temperature of the distiller is controlled to be 930° C., the middle temperature to be 780° C., and the upper temperature to be 70° C.; impurities with the high melting point are removed from the lower part, including Fe, Ni, Co, Si and Ca; metal impurities with a low melting point are removed from an upper part, including k, Na, and a magnesium-lithium alloy is discharged from a middle part.

The obtained magnesium-lithium alloy is detected according to the national standards, and the mass percentages of all elements are as follows:

| Mg | Li | Fe | Ni | Cu | Al | Mn |
|---|---|---|---|---|---|---|
| 90.151 | 9.8 | 0.0013 | 0.00032 | 0.00038 | 0.006 | 0.0005 |
| Ti | Ca | Si | Zn | K | Na | Others |
| 0.0003 | 0.016 | 0.0038 | 0.0007 | 0.0047 | 0.008 | 0.007 |

Embodiment 3

A method for producing a magnesium-lithium alloy by the gaseous co-condensation method, comprising the following steps:

1) An industrial grade lithium nitrate is roasted at the temperature of 680° C. for 7 h to form stable $Li_2O \cdot 1.75$ CaO without briquetting, wherein the decomposition rate of lithium nitrate decomposed into lithium oxide is 98.1%, and a yield of metal lithium reaches 90.1%.

2) The mass ratio of the unsaturated composite oxide formed by the lithium oxide obtained in step 1) to MgO is 79.5:20.5; the unsaturated composite oxide, the MgO, silicon iron and $CaF_2$ are respectively crushed till the granularity is 60 μm, and then mixed according to the mass ratio of the total mass of the unsaturated composite oxide and the MgO to the silicon iron to the $CaF_2$ of 80:18:2, and finally pressed into almond briquettes at the weight of 30 g/Nr. under the pressure of 35 Mpa.

3) The briquettes in step 2) are put into a φ330 mm*3,300 mm industrial heat-resistant tube furnace with the vacuum degree of 3 pa and the temperature of 1,200° C.; and at this time, the reduction product is in the gaseous state and carries solid materials, the magnesium reduction recovery is more than 88.6%, and the lithium reduction is 89.3%.

4) the gas carrying solid particles passes through the gas at the air flow velocity of 1.4/sec, the centrifugal separation dedusting temperature with the jacket is controlled to be 910° C., the gas carrying 98% of more than 20 μm solid particles is removed while passing through the first condensing chamber, more than 99.95% of carried dust is purified when the gas passes through 0.5 μm micron ceramic filter, and the gas temperature at the outlet is controlled to be 720° C.

5) The pure metal gas passes through the quenched second condensing chamber; for the condenser that is a double-casing cooler, when the internal temperature is controlled to be 60° C., the low temperature cooling liquid below −110° C. is thermally exchanged with the metal gas on the outer layer; heat is transferred to the inner wall from the center of the cooler by the gas at 4 m/sec, and the cooling area is 0.55 dm$^3$/kg, so that the metal gas may be rapidly condensed as the condensed phase of the alloy.

6) A magnesium-lithium alloy raw ingot having a purity being 99.5% is obtained by flux smelting and refining of the magnesium-lithium alloy in the condensed phase in the pit furnace under the protection of Ar.

7) A magnesium-lithium alloy raw ingot is separated by distillation, the lower temperature is controlled to be 880° C., the middle temperature to be 730° C., and the upper temperature to be lower than 80° C.; impurities with the high melting point are removed from the lower part, including Fe, Ni, Co, Si and Ca, metal impurities with the high melting point are removed from the upper part, including k, Na, and the magnesium-lithium alloy is discharged from a middle part.

The obtained magnesium-lithium alloy is detected according to the national standards, and the mass percentages of all elements are as follows:

| Mg | Li | Fe | Ni | Cu | Al | Mn |
|---|---|---|---|---|---|---|
| 89.651 | 10.3 | 0.0015 | 0.00045 | 0.00035 | 0.003 | 0.0008 |
| Ti | Ca | Si | Zn | K | Na | Others |
| 0.0003 | 0.018 | 0.0067 | 0.0008 | 0.0031 | 0.009 | 0.005 |

With a rather long decomposition time during the thermal decomposition, the direct thermal decomposition of lithium nitrate will cause low lithium yield and high energy consumption ratio during the thermal decomposition; the unsaturated composite oxide formed by decomposition into the lithium oxide, MgO, silicon iron and $CaF_2$ are crushed and mixed difficultly, and mixed nonuniformly; the proportions thereof in the almond briquettes are not uniform, and the reduction is lowered. Compared with the lithium carbonate, links are complicated in the whole process, and the yield is lower than that of the lithium carbonate, thereby increasing the manufacturing cost.

Embodiment 4

1) An industrial grade lithium sulfate is roasted at the temperature of 920° C. for 8 h to form stable $Li_2O \cdot 1.85$ CaO (MgO) without briquetting, wherein the decomposition rate of lithium sulfate decomposed into lithium oxide is 95.1%, and a yield of metal lithium reaches 96.1%.

2) The mass ratio of the unsaturated composite oxide formed by the lithium oxide obtained in step 1) to MgO is 80.2:19.8; the unsaturated composite oxide, the MgO, silicon iron and $CaF_2$ are respectively crushed till the granularity is 60 and then mixed according to the mass ratio of the total mass of the unsaturated composite oxide and the MgO to the silicon iron to the $CaF_2$ of 80:18:2, and finally pressed into almond briquettes at the weight of 30 g/Nr. under the pressure of 35 Mpa.
3) The briquettes in step 1) are respectively charged into a φ330 mm*3,300 mm industrial heat-resistant tube furnace with the vacuum degree of 3 pa and the temperature of 1,220° C.; and at this time, the reduction product is in a gaseous state and carries solid materials, the magnesium reduction recovery is more than 90.2%, and a lithium reduction is 88.2%.
4) The gas carrying solid particles passes through the gas at the air flow velocity of 1.45/sec, the centrifugal separation dedusting temperature with the jacket is controlled to be 920° C., the gas carrying 98% of more than 20 μm solid particles is removed while passing through the first condensing chamber, more than 99.95% of carried dust is purified when the gas passes through 0.5 μm micron ceramic filter, and the gas temperature at an outlet is controlled to be 740° C.
5) The pure metal gas passes through the quenched second condensing chamber; for the condenser that is a double-casing cooler, when the internal temperature is controlled to be 65° C., the low temperature cooling liquid below −110° C. is thermally exchanged with the metal gas on the outer layer; heat is transferred to the inner wall from the center of the cooler by the gas at 2.8 m/sec, and the cooling area is 0.6 dm³/kg, so that the metal gas may be rapidly condensed as the condensed phase of the alloy.
6) A magnesium-lithium alloy raw ingot having a purity being 99.5% is obtained by flux smelting and refining of the magnesium-lithium alloy in the condensed phase in the pit furnace under the protection of Ar.
7) A magnesium-lithium alloy raw ingot is separated by distillation, the lower temperature is controlled to be 870° C., the middle temperature to be 720° C., and the upper temperature to be 70° C.; impurities with the high melting point are removed from the lower part, including Fe, Ni, Co, Si and Ca, metal impurities with the high melting point are removed from the upper part, including k, Na, and the magnesium-lithium alloy is discharged from a middle part.

The obtained magnesium-lithium alloy is detected according to the national standards, and the mass percentages of all elements are as follows:

| Mg | Li | Fe | Ni | Cu | Al | Mn |
|---|---|---|---|---|---|---|
| 91.05 | 8.9 | 0.0016 | 0.0002 | 0.0005 | 0.0041 | 0.0006 |
| Ti | Ca | Si | Zn | K | Na | Others |
| 0.0004 | 0.016 | 0.0059 | 0.0009 | 0.0048 | 0.009 | 0.006 |

Through repeated verification, the impurity contents in the magnesium-lithium alloy are better than those specified in Standards GB/T5153-2016 and GB/T33141-2016.

Lithium sulfate is decomposed more difficultly compared with lithium carbonate and cannot be decomposed completely. Hence, the direct thermal decomposition will cause low lithium yield, high energy consumption ratio, and long thermal decomposition time; the unsaturated composite oxide formed by decomposition into the lithium oxide, MgO, silicon iron and $CaF_2$ are crushed and mixed difficultly, and mixed nonuniformly; the proportions thereof in the almond briquettes are not uniform, and the reduction is lowered. Compared with the lithium carbonate, intermediate links of the whole process are complicated, and the yield is lower than that of the lithium carbonate, and the manufacturing cost is increased.

Experiment 1

Raw materials and method steps in Embodiment 1 are used for experiment, which only changes the temperatures of first and second condensing chambers in the temperature control device, and other conditions are the same as Embodiment 1. Specific test conditions and results are as follows:

| First condensing chamber (degree) | Outlet of first condensing chamber (degree) | Second condensing chamber (degree) | Configuration | Test result |
|---|---|---|---|---|
| 980 | 800 | 90 | Fluffy, condensed metal | General |
| 880 | 730 | 65 | Condensed metal, easily collected | Good |
| 780 | 650 | 40 | Condensed metal, uneasily collected | Poor |

It can be seen from the tests that a condensed metal of the magnesium-lithium alloy, formed when the temperature of the first condensing chamber is 880° C. and the temperature of the second condensing chamber is 65° C., is the best and easily collected. When the temperatures of the first and second condensing chambers are high, the magnesium-lithium alloy is fluffy and has the general form. If the temperatures of the first and second condensing chambers are too low, the formed condensed metal is collected uneasily, and cannot form the briquettes.

Experiment 2

Raw materials and method steps in Embodiment 1 are used for experiments, which only changes reduction conditions, and other conditions are the same as Embodiment 1, so that the influences of different reduction conditions on the present application are tested. The specific test conditions and results are below:

| Reduction temperature (° C.) | Reduction time (min) | Reduction vacuum degree (pa) | Li reduction rate (%) | Mg reduction rate (%) | Magnesium-lithium alloy uniformity |
|---|---|---|---|---|---|
| 1000 | 600 | 3 | 62.1 | 48.5 | Poor |
| 1100 | 480 | 2 | 79.3 | 61.5 | Rather Poor |
| 1100 | 600 | 4 | 96.1 | 71.1 | Rather good |
| 1190 | 480 | 5 | 87.2 | 83.1 | Rather good |
| 1190 | 600 | 2 | 99.2 | 95.1 | Excellent |

We can see the table that the product reduction rate reaches 99.2% and the Mg reduction rate reaches 95.1% when the reduction temperature is 1,190° C. and the reduction time is 10 h. The reduction temperature is lowered to cause biased proportion of the magnesium-lithium alloy and decrease of reduction rate and yield, thereby increasing the manufacture cost.

Experiment 3

Raw materials and method steps in Embodiment 1 are used for experiment, which only changes the temperatures of the distiller in a refining step, and other conditions are the same as Embodiment 1. Specific test conditions and results are as follows:

Refining test conditions are shown in the table below:

| Temperature (° C.) | Mixing time (min) | Argon 99.99% (Mpa) | Synthesized ingot |
|---|---|---|---|
| 780 | 15 | 0.2 | 1# |
| 680 | 30 | 0.2 | 2# |
| 580 | 60 | 0.2 | 3# |

The magnesium-lithium alloy results are shown in the table below:

| 1# | Mg | Li | Fe | Ni | Cu | Al | Mn | Phase analysis |
|---|---|---|---|---|---|---|---|---|
|  | 90.2002 | 9.3 | 0.02 | 0.003 | 0.005 | 0.03 | 0.025 | Stable α + β phase, |
|  | Ti | Ca | Si | Zn | K | Na | Others | uniformly distributed |
|  | 0.005 | 0.043 | 0.15 | 0.0008 | 0.03 | 0.18 | 0.008 | phase composition |
| 2# | Mg | Li | Fe | Ni | Cu | Al | Mn | Stable α + β phase, |
|  | 91.1239 | 8.3 | 0.02 | 0.0031 | 0.0051 | 0.03 | 0.024 |  |
|  | Ti | Ca | Si | Zn | K | Na | Others |  |
|  | 0.048 | 0.045 | 0.145 | 0.0009 | 0.025 | 0.18 | 0.05 |  |
| 3# | Mg | Li | Fe | Ni | Cu | Al | Mn | Stable α + β phase, |
|  | 91.8741 | 7.5 | 0.02 | 0.0029 | 0.0053 | 0.03 | 0.026 | with defects locally |
|  | Ti | Ca | Si | Zn | K | Na | Others |  |
|  | 0.052 | 0.041 | 0.148 | 0.0007 | 0.03 | 0.18 | 0.09 |  |

According to the table, we can see that the rather ideal smelting temperature is reached after stirring for 15 min at the temperature of 780° C. in the presence of 99.99% argon, so that the melt-casted magnesium-lithium alloy is not segregated and the stable α+β phase is formed; if the magnesium-lithium alloy is segregated unstably due to too low temperature, oxides in the product will increase.

Those skilled in the art should be able to implement or use the present invention according to the description of the embodiments disclosed above. Various amendments to these embodiments will be obvious to those skilled in the art. The general principle defined herein can be implemented in other embodiments without departing from the spirit or scope of the present invention. Thus, the present invention will not be intended to be limited to these embodiments herein, and the broadest scope consistent with the principles and novel features disclosed herein shall prevail.

The invention claimed is:

1. A method for producing a magnesium-lithium alloy, comprising:
 1) mixing a lithium salt, a refractory agent, and a catalyst to form a mixture, briquetting the mixture to obtain first briquets of the mixture under pressure, feeding the first briquets into an industrial tube furnace for thermal decomposition to form an unsaturated composite oxide comprising lithium oxide and the refractory agent, and sublimating and condensing the catalyst for further use;
 2) crushing and ball-milling the unsaturated composite oxide generated in step 1), magnesium oxide, the reducing agent, and a fluxing agent, and then briquetting to form second briquets;
 3) charging second briquettes obtained from step 2) into an industrial heat-resistant tube furnace for vacuum reduction to form a reduction product, wherein the reduction product is a gas that contains solids;
 4) conducting a first filtration by passing the gas containing solids obtained from step 3) through a centrifugal filter in a dust chamber of a temperature control device, and then entering a first condensing chamber to remove solids from the gas, wherein the temperatures of the centrifugal filter and the first condensing chamber are 850-950° C. at a flow velocity of 1.2-1.8 m/sec; and conducting a second filtration by the first-filtered gas through a micron ceramic filter, and wherein an outlet temperature of the micron ceramic filter is at 700-750° C., and wherein 99.95% of solids in the gas is removed after the first filtration and the second filtration to form a purified gas;
 5) passing the purified gas from step 4) through a second condensing chamber in a quenching device, wherein the purified gas is cooled by exchanging heat with a cooling liquid having a temperature of below −100° C. passing through an outer jacket disposed about the second condensing chamber, whereby condensing metal vapor in the purified gas to form a condensed alloy;
 6) obtaining a coarse magnesium-lithium alloy having a purity of 99.5% or above using flux smelting and refining of the condensed alloy in a pit furnace under protection of Ar; and
 7) purifying the coarse magnesium-lithium alloy by distillation in a distillation column to obtain the magnesium-lithium alloy having a purity of 99.95% or above.

2. The method according to claim 1, wherein the lithium salt is lithium-containing carbonate, nitrate, sulfate, silicate, or lithium-containing sulfide, the refractory agent is CaO, $Al_2O_3$ or MgO, and the catalyst is $Sb_2O_3$ or $Bi_2O_3$, and a molar ratio of the lithium salt to the refractory agent to the catalyst is 1:1.4-1.8:0.2-0.8.

3. The method according to claim 1, wherein in step 1), a granularity of each of the lithium salt, the refractory agent and the catalyst is less than 100 μm; each of the first briquettes is of an almond shape at a weight of 25-35 g/Nr, and is briquetted at a pressure of 35-45 Mpa, and has a thermal decomposition temperature of 860-900° C.

4. The method according to claim 1, wherein in step 2) the granularity thereof each of the unsaturated composite oxide generated in step 1), magnesium oxide, the reducing agent, and a fluxing agent is 40-100 μm after ball-milling, and is briquetted into an almond shape at a weight of 25-35 g/Nr. at 30-45 Mpa.

5. The method according to claim 1, wherein the reducing agent is high silicon iron, aluminium powder having an Al content of more than or equal to 99 wt %, aluminium powder having an activity of 70 wt % and a granularity of less than 8 μm, aluminum silicon powder having an Al—Si content of more than or equal to 98% or carbon powder; the fluxing agent is $CaF_2$ of a purity of 97.5%; and a mass ratio of the unsaturated composite oxide to the magnesium oxide is 3-80:20-97; and a mass ratio of a total mass of the unsaturated composite oxide and the magnesium oxide to the reducing agent to the fluxing agent is 76-87:15-23:1-3.

6. The method according to claim 1, wherein the industrial tube furnace for thermal decomposition is at a vacuum of 10-20 pa, a temperature of 860-950° C., a dimension of φ159-φ330 mm*3,300 mm, and a thermal decomposition rate of more than or equal to 99%.

7. The method according to claim 1, wherein step 1) is carried out in a reaction zone, wherein the reaction zone is in communication with the dust chamber, the centrifugal filter is arranged in the dust chamber and has a lower end in the shape of a funnel, a lower end of one side of the funnel is provided with a heating zone inlet, and a slag discharge hole of the dust chamber is defined at the bottom of the funnel, an upper end of one side of the dust chamber is provided with a first heating zone outlet, a top of the dust chamber (2) is provided with the first condensing chamber, a second heating zone outlet is defined at an upper end of a connection between the first condensing chamber and the dust chamber, and the micron ceramic filter is arranged in the first condensing chamber, the first condensing chamber is in communication with the second condensing chamber, a second heating zone inlet is defined in a connection with the second condensing chamber in the first condensing chamber, a vacuum tube is arranged on a connection with the first condensing chamber within the second condensing chamber, and a cooling liquid inlet, a cooling air inlet, a cooling liquid outlet, and a cooling air outlet are defined on the condensing chamber.

8. The method according to claim 7, wherein the first condensing chamber and the second condensing chamber are double-casing coolers, and in the second condensing chamber, a gas velocity is 1.5 m/sec, and a ratio of the cooling area to the condensed alloy is 0.4-0.7 $dm^3$/kg.

9. The method according to claim 7, wherein in the distillation column, a lower temperature is at 850-950° C., a middle temperature is at 700-800° C., and a upper temperature of lower than 100° C., subject the middle stream to ingot casting to obtain the magnesium-lithium alloy.

* * * * *